United States Patent [19]
Hodges

[11] Patent Number: 5,475,943
[45] Date of Patent: Dec. 19, 1995

[54] FISHING TACKLE BOXES WITH SEPARABLE LEAVES FOR SUPPORTING LURES

[76] Inventor: Earl M. Hodges, R.R. 1, Site 16, Comp 9, Fort St. John, B.C. VIJ 4M6, Canada

[21] Appl. No.: 183,867

[22] Filed: Jan. 21, 1994

[51] Int. Cl.$^6$ .................................................. A01K 97/06
[52] U.S. Cl. ............................................................ 43/57.1
[58] Field of Search ................................... 43/54.1, 57.1; 206/315.11, 315.1

[56] References Cited

U.S. PATENT DOCUMENTS

| | | | |
|---|---|---|---|
| 1,954,127 | 4/1934 | Harsted | 43/57.1 |
| 2,220,817 | 11/1940 | Holmes | 43/57.1 |
| 3,377,736 | 4/1968 | Woolworth | 43/57.1 |
| 4,020,584 | 5/1977 | Michal | 43/57.1 |
| 4,729,474 | 3/1988 | Lanius et al. | 206/315.11 |
| 4,791,752 | 12/1988 | Van Kampen | 43/54.1 |
| 4,829,699 | 5/1989 | Perkins | 43/57.1 |

*Primary Examiner*—P. Austin Bradley
*Assistant Examiner*—Chuck Y. Mah

[57] ABSTRACT

A fishing tackle box with separable leaves for supporting lures comprising a lower component and a bottom wall with the edges thereof coupled with the lower edges of the side walls and with an open upper end defining a chamber. A lid constitutes an upper component and has side walls and with a top wall with the edges thereof coupled with the upper edges of the side walls and with a lower open end defining a chamber thereabove. A hinge couples the lower component with the upper component. A handle is on the upper surface of the lid and a latch interconnects the components along edges thereof. An intermediate support component has rectangular side walls, a rear wall and a lower wall with a pair of parallel link rods secured at their lower ends to the interior of the lower component and at their upper ends to the side walls of the intermediate component. A plurality of leaves are pivotally secured at their lower ends to the interior of the sides of the intermediate support component with rods for the support of lures thereon with spring-urged pins to allow the pins to be depressed for removing the individual leaves from the intermediate component. Each leaf has a fabric covering for providing rigidity to lures positioned on the rods.

5 Claims, 3 Drawing Sheets

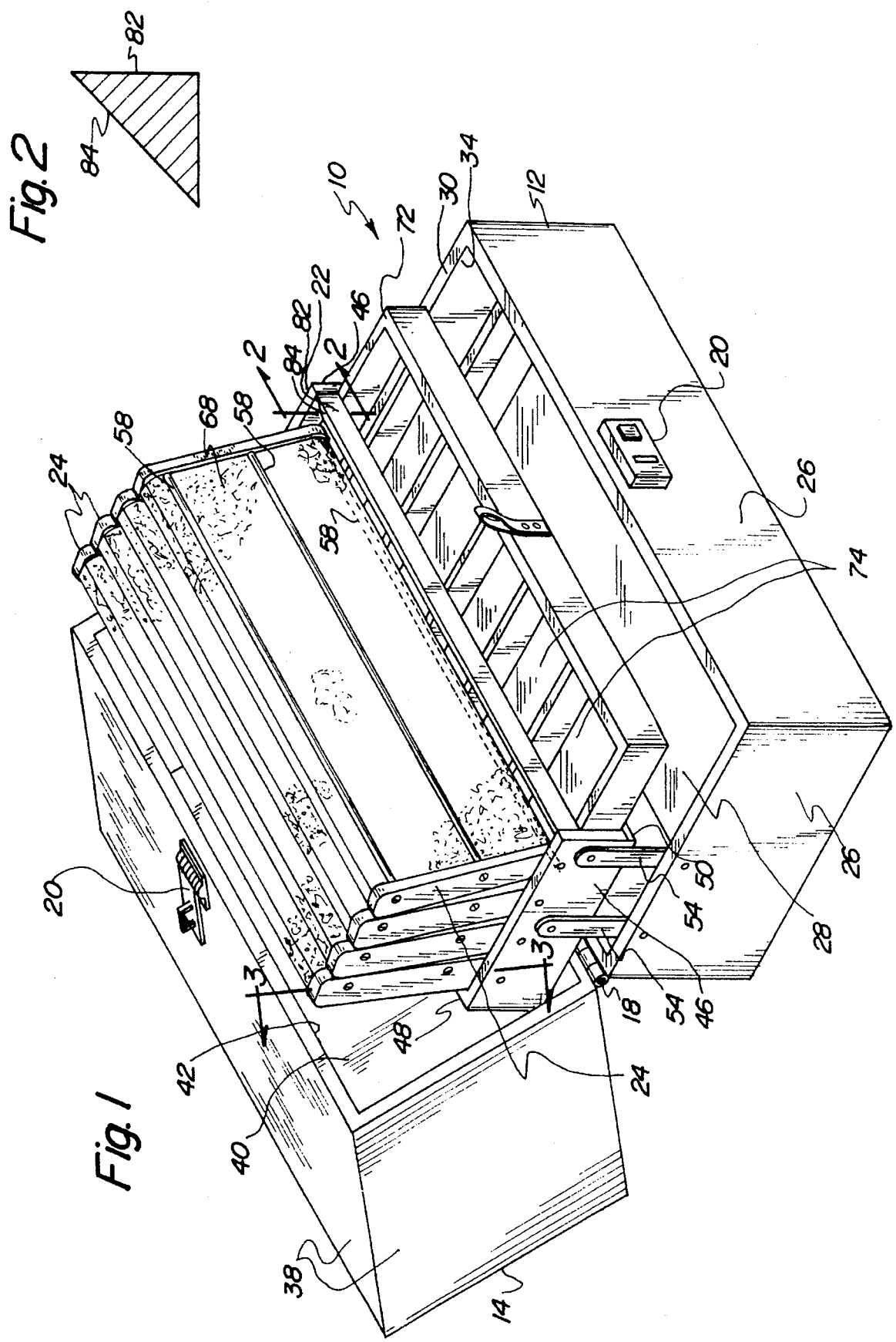

FISHING TACKLE BOXES WITH SEPARABLE LEAVES FOR SUPPORTING LURES

BACKGROUND OF THE INVENTION

1. Field of the Invention

The present invention relates to fishing tackle boxes with separable leaves for supporting lures and more particularly pertains to supporting fishing related elements in a sorted condition and for suspending lures separated one from another in a non-tangle orientation on separable leaves.

2. Description of the Prior Art

The use of tackle boxes is known in the prior art. More specifically, tackle boxes heretofore devised and utilized for the purpose of storing and transporting lures and fishing related elements are known to consist basically of familiar, expected, and obvious structural configurations, notwithstanding the myriad of designs encompassed by the crowded prior art which has been developed for the fulfillment of countless objectives and requirements.

The prior art discloses a large number of tackle boxes. By way of example, U.S. Pat. No. 4,770,327 to Fortson discloses a portable fishing tackle box with optional lure arrangement features.

U.S. Pat. No. 4,827,658 to Wolniak discloses a fishing tackle box with vertical storage compartments.

U.S. Pat. No. 4,958,730 to Bunten discloses a compartmented supported fishing lure tackle box.

U.S. Pat. No. 5,095,645 to Borawksi discloses a fishing lure holder.

Lastly, U.S. Pat. No. 5,185,952 to Bruce discloses a lure storage container.

In this respect, fishing tackle boxes with separable leaves for supporting lures according to the present invention substantially depart from the conventional concepts and designs of the prior art, and in doing so provide an apparatus primarily developed for the purpose of supporting fishing related elements in a sorted condition and for suspending lures separated one from another in a non-tangle orientation on separable leaves.

Therefore, it can be appreciated that there exists a continuing need for new and improved fishing tackle boxes with separable leaves for supporting lures which can be used for supporting fishing related elements in a sorted condition and for suspending lures separated one from another in a non-tangle orientation on separable leaves. In this regard, the present invention substantially fulfills this need.

SUMMARY OF THE INVENTION

In view of the foregoing disadvantages inherent in the known types of tackle boxes now present in the prior art, the present invention provides improved fishing tackle boxes with separable leaves for supporting lures. As such, the general purpose of the present invention, which will be described subsequently in greater detail, is to provide new and improved fishing tackle boxes with separable leaves for supporting lures and methods which have all the advantages of the prior art and none of the disadvantages.

To attain this, the present invention essentially comprises a new and improved fishing tackle box with separable leaves for supporting lures comprising, in combination, a lower component having vertically extending side walls in a rectangular configuration and a bottom wall in a rectangular configuration with the edges thereof coupled with the lower edges of the side walls and with an open upper end defining a chamber therein. A lid constitutes an upper component having vertically extending side walls in a rectangular configuration and with a top wall in a rectangular configuration with the edges thereof coupled with the upper edges of the side walls and with a lower open end defining a chamber thereabove. A hinge couples upper edges of the lower component with the lower edges of the upper component for moving the lid between an open orientation for exposing the chambers of the components and a closed orientation sealing the chambers together. A handle is on the upper surface of the lid and a latch interconnects the components along edges thereof opposite from the hinge. An intermediate support component has vertically extending rectangular side walls, a rear wall and a lower wall coupled with respect to each other at their edges, a pair of parallel link rods secured at their lower ends to the interior of the lower component and at their upper ends to the side walls of the intermediate component for movement of the intermediate component between a raised orientation out of the lower component and a lowered orientation within the lower component. A plurality of leaves are arranged in pairs pivotally secured at their lower ends to the interior of the sides of the intermediate support component with rods extending across the length of the intermediate component for the support of lures thereon, the pivotal coupling of the lower ends to the intermediate support being through open apertures with spring-urged pins to allow the pins to be depressed for removing the individual leaves from the intermediate component, each leaf having a fabric covering for providing rigidity to lures positioned on the rods. A drawer formed of a plurality of compartments is reciprocally mounted within the intermediate component and is movable from a recessed storage orientation at which the box may be closed into an extended operative position for viewing and handling the contents of the drawer in which orientation the box must be opened. A transparent window is positioned over each of the compartments of the drawer, each of the transparent windows having three free ends and a rearmost end with a hinge secured between the innermost edge of the drawer and the adjacent edge of the window. A stop-bar is located at the forward end of the side supports across the width thereof with an angled interior surface adapted to limit the forward rotation of the forwardmost leaf.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved fishing tackle boxes with separable leaves for supporting lures which have all the advantages of the prior art tackle boxes and none of the disadvantages.

It is another object of the present invention to provide new and improved fishing tackle boxes with separable leaves for supporting lures which may be easily and efficiently manufactured and marketed.

It is a further object of the present invention to provide new and improved fishing tackle boxes with separable leaves for supporting lures which are of a durable and reliable construction.

An even further object of the present invention is to provide new and improved fishing tackle boxes with separable leaves for supporting lures which are susceptible of a low cost of manufacture with regard to both materials and labor, and which accordingly are then susceptible of low prices of sale to the consuming public, thereby making such fishing tackle boxes with separable leaves for supporting lures economically available to the buying public.

Still yet another object of the present invention is to provide new and improved fishing tackle boxes with separable leaves for supporting lures which provide in the apparatuses and methods of the prior art some of the advantages thereof, while simultaneously overcoming some of the disadvantages normally associated therewith.

Even still another object of the present invention is to support fishing related elements in a sorted condition and to suspend lures separated one from another in a non-tangle orientation on separable leaves.

Lastly, it is an object of the present invention to provide new and improved fishing tackle boxes with separable leaves for supporting lures comprising a fishing tackle box with separable leaves for supporting lures comprising a lower component having side walls in a rectangular configuration and a bottom wall in a rectangular configuration with the edges thereof coupled with the lower edges of the side walls and with an open upper end defining a chamber therein. A lid constitutes an upper component having side walls in a rectangular configuration and with a top wall in a rectangular configuration with the edges thereof coupled with the upper edges of the side walls and with a lower open end defining a chamber thereabove. A hinge couples upper edges of the lower component with the lower edges of the upper component for moving the lid between an open orientation and a closed orientation. A handle is on the upper surface of the lid and a latch interconnects the components along edges thereof opposite from the hinge. An intermediate support component has rectangular side walls, a rear wall and a lower wall coupled with respect to each other at their edges with a pair of parallel link rods secured at their lower ends to the interior of the lower component and at their upper ends to the side walls of the intermediate component for movement of the intermediate component between a raised orientation and a lowered orientation. A plurality of leaves are pivotally secured at their lower ends to the interior of the sides of the intermediate support component with rods extending across the length of the intermediate component for the support of lures thereon, the pivotal coupling of the lower ends to the intermediate support being through open apertures with spring-urged pins to allow the pins to be depressed for removing the individual leaves from the intermediate component, each leaf having a fabric covering for providing rigidity to lures positioned on the rods.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective illustration of the preferred embodiment of the fishing tackle boxes with separable leafs for supporting lures constructed in accordance with the principles of the present invention.

FIG. 2 is a cross-sectional view of a portion of the tackle box shown in FIG. 1 taken along line 2—2 of FIG. 1.

The same reference numerals refer to the same parts throughout the various Figures.

DESCRIPTION OF THE PREFERRED EMBODIMENT

Figure 3:
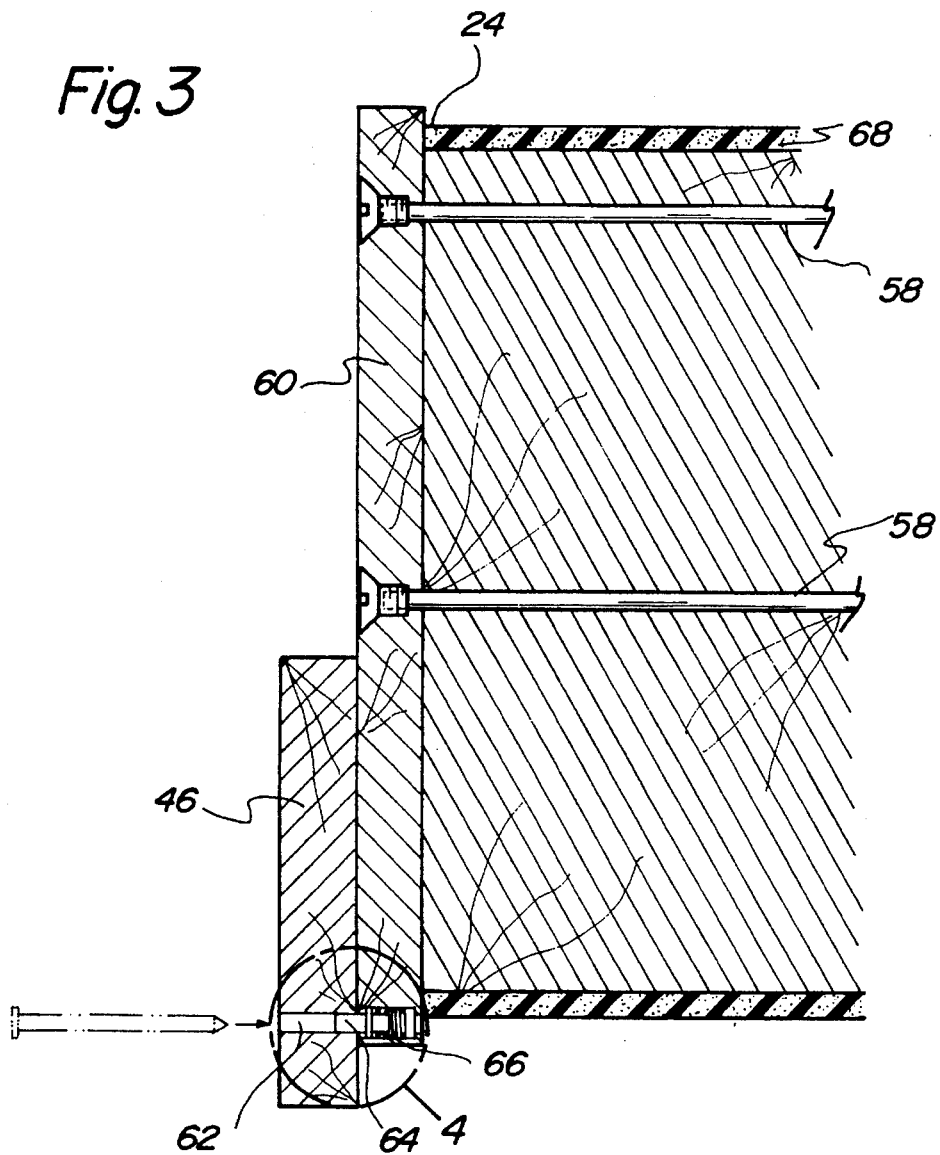
FIG. 3 is a cross-sectional view of a portion of the tackle box taken along line 3—3 of FIG. 1.
Figure 4:
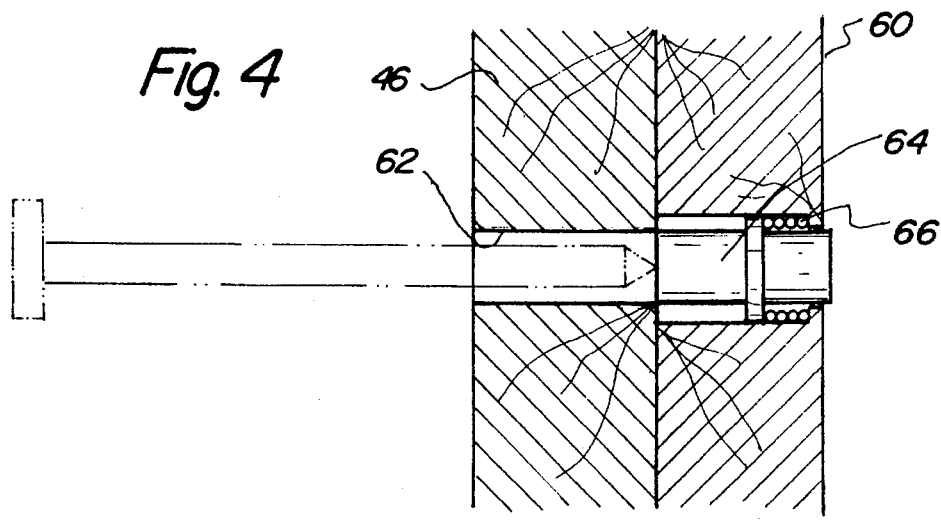
FIG. 4 is an enlarged illustration of the portion of the tackle box of FIG. 3 taken at circle 4.

With reference now to the drawings, and in particular to FIG. 1 thereof, the preferred embodiment of the new and improved fishing tackle boxes with separable leafs for supporting lures embodying the principles and concepts of the present invention and generally designated by the reference numeral 10 will be described.

Specifically, it will be noted with reference to FIGS. 1 through 4 that the present invention is a new and improved fishing tackle box 10 with separable leaves for supporting lures. The box 10 includes a lower and upper component 12 and 14, a hinge 18, and intermediate support 20 and a plurality of leaves 24, all arranged and configured to achieve the desired result.

More specifically, the box 10 includes a lower component 12. The lower component has vertically extending side walls 26 in a rectangular configuration. A horizontal bottom wall 28 is formed in a rectangular configuration with the edges thereof coupled with the lower edges of the side walls 26. The walls form an open upper end 32 to define a chamber 34 therein.

A lid constitutes an upper component 14. Such component has vertically extending side walls 38 in a rectangular configuration. A horizontal top wall 40, also in a rectangular configuration, has its edges coupled with the upper edges of the side walls 38 to form a lower open end which defines an upper chamber 42 thereabove.

A hinge 18 couples the upper edges of the lower component 12 with the lower edges of the upper component 14. The hinges functions for allowing movement of the lid between an open orientation for exposing the chambers 34 and 42 of the components and a closed orientation sealing the chambers together.

A handle, not shown but conventional in design, is located on the upper surface of the lid 16, and a latch 20 interconnects the components along edges thereof opposite from the hinge.

An intermediate support component 22 is also provided. Such component has vertically extending rectangular side walls 46. A rear wall 48 and a lower wall 50 are coupled with respect to each other at their edges. A pair of parallel link rods 54 on each side of the device 10 are secured at their lower ends to the interior of the lower component 12 and at their upper ends to the side walls 46 of the intermediate component 22. Such arrangement allows for movement of the intermediate component 22 between a raised orientation out of the lower component as shown on FIG. 1 and a lowered orientation within the lower component, not shown.

A plurality of leaves 24 are arranged with edge supports 10 in pairs. The leaves 24 are pivotally secured at their lower ends to the interior of the sides of the intermediate support component 22. The leaves 24 have with rods 58 extending across the width of the intermediate component 22 for the support of lures, not shown, thereon. The rods 58 for each leaf include a plurality of rods in parallel relationship at the top and bottom of each pair of side supports 60 and at least one intermediate location.

The pivotal coupling of the lower ends of the supports 60 to the intermediate support 22 are through open apertures 62 with pins 64 urged by springs 66 to allow the pins 64 to be depressed. When depressed, as by a nail, the pins 64 will recess from apertures 62 and will allow removal of the individual leaves 24 from the intermediate component 22. Each leaf 24 has a fabric covering 68 for providing rigidity to lures positioned on the rods 58.

Figure 5:
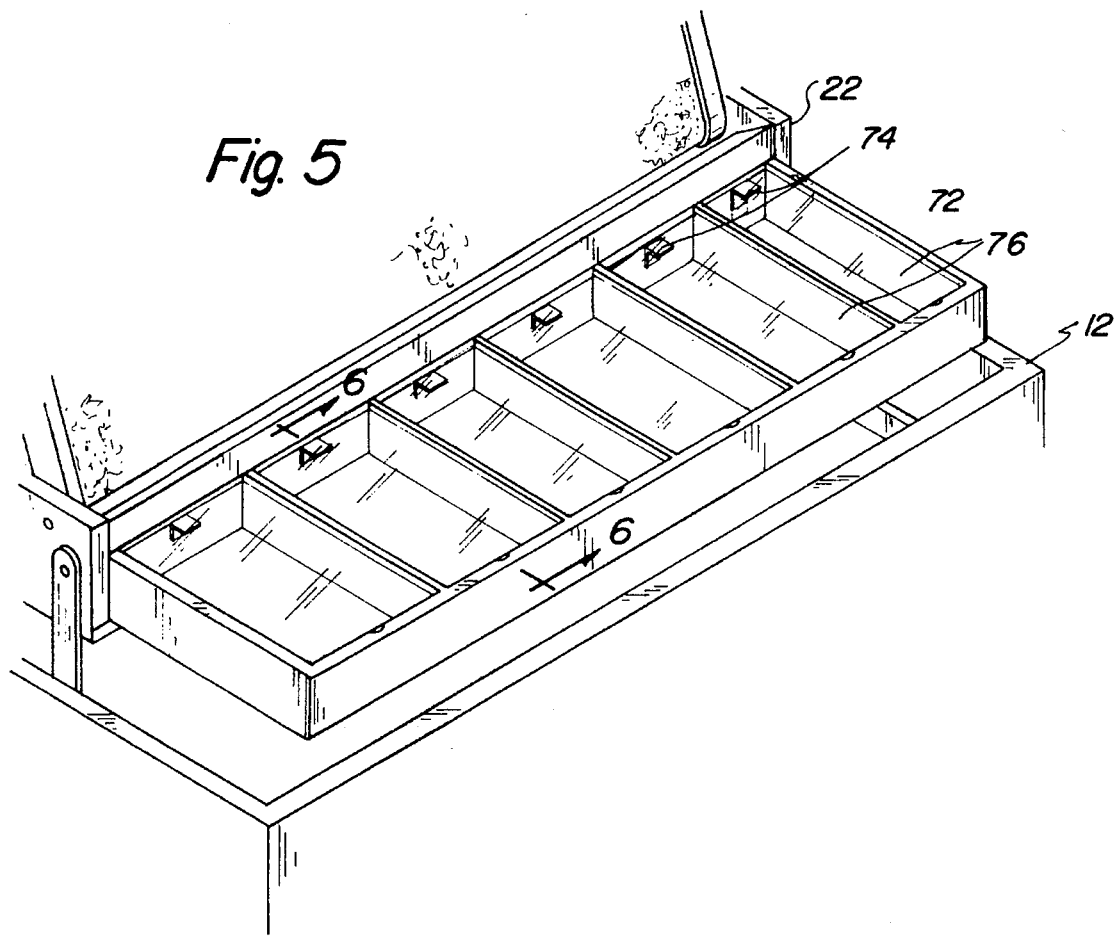
FIG. 5 is an enlarged perspective illustration of a drawer for the tackle box of the prior Figures constructed in accordance with an alternate embodiment of the invention.

A drawer 72 is formed of a plurality of compartments 74 reciprocally mounted within the intermediate component 22. The drawer is movable from a recessed storage orientation as shown in FIG. 5 whereby the box may be closed into an extended operative orientation. The operative orientation is for viewing and handling the contents of the drawer. The drawer must be in the operative orientation to be opened.

Figure 6:
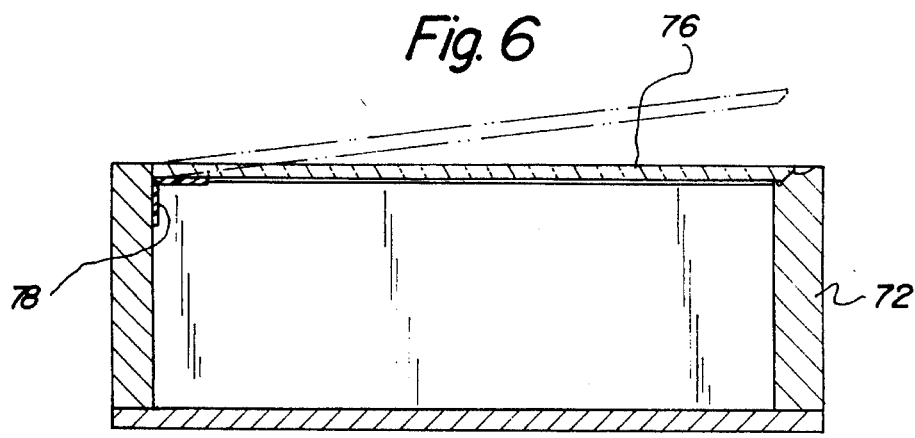
FIG. 6 is a sectional view of the tackle box of FIG. 5 taken along line 6—6 of FIG. 5.

A transparent window 76 is positioned over each of the compartments of the drawer in the alternate embodiment of FIGS. 5 and 6. Each of the transparent windows 76 has three free ends and a rearmost end with a hinge 78 secured between the innermost edge of the drawer and the adjacent edge of the window.

A stop-bar 82 is located at the forward end of the side supports across the width thereof with an angled interior surface 84 adapted to limit the forward rotation of the forward most leaf 24.

When properly made this tackle box will not allow the fishing tackle to become tangled even when the box has been turned upside down even if the box is loaded with fishing gear. The lures are hung vertically and kept in place by being tucked behind an expandable band or between the leaves that hold the lures. It is preferably fabricated of fiberglass and is strong enough to be sat upon in a boat. Further, the construction is such as to allow the box to float in the water. The leaves are to be moved enough to be loaded individually which, when used with the drawers, extend the utility of the box.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved fishing tackle box with separable leaves for supporting lures comprising, in combination:

a lower component having vertically extending side walls in a rectangular configuration and a bottom wall in a rectangular configuration with the edges thereof coupled with the lower edges of the side walls and with an open upper end defining a chamber therein;

a lid constituting an upper component having vertically extending side walls in a rectangular configuration and with a top wall in a rectangular configuration with the edges thereof coupled with the upper edges of the side walls and with a lower open end defining a chamber thereabove;

a hinge coupling an upper edge of the lower component with an adjacent edge of the upper component for moving the lid between an open orientation for exposing the chambers of the components and a closed orientation sealing the chambers together;

a handle on the upper surface of the lid and a latch interconnecting the components along adjacent edges thereof opposite from the hinge;

an intermediate support component having vertically extending rectangular side walls, a rear wall and a lower wall coupled with respect to each other at their edges, a pair of parallel link rods secured at their lower ends to the interior of the lower component and at their upper ends to the side walls of the intermediate component for movement of the intermediate component between a raised orientation out of the lower component and a lowered orientation within the lower component;

a plurality of leaves arranged in pairs pivotally secured at their lower ends to the interior of the sides of the intermediate support component with rods extending across the length of the intermediate component for the support of lures thereon, the pivotal coupling of the lower ends to the intermediate support being through open apertures with spring-urged pins to allow the pins to be depressed for removing the individual leaves from the intermediate component, each leaf having a fabric covering for providing rigidity to lures positioned on the rods;

a drawer formed of a plurality of compartments reciprocally mounted within the intermediate component and movable from a recessed storage orientation at which the box is closed and an extended operative position for viewing and handling the contents of the drawer in which orientation the box must be opened;

a transparent window positioned over each of the compartments of the drawer, each of the transparent windows having three free ends and a rearmost end with a hinge secured between the innermost edge of the drawer and the adjacent edge of the window; and a stop-bar located at the forward end of the side supports across the width thereof with an angled interior surface adapted to limit the forward rotation of the forwardmost leaf.

2. A fishing tackle box with separable leaves for supporting lures comprising:

a lower component having vertically extending side walls in a rectangular configuration and a bottom wall in a rectangular configuration with the edges thereof coupled with the lower edges of the side walls and with an open upper end defining a chamber therein;

a lid constituting an upper component having vertically extending side walls in a rectangular configuration and with a top wall in a rectangular configuration with the edges thereof coupled with the upper edges of the side walls and with a lower open end defining a chamber thereabove;

a hinge coupling an upper edges of the lower component with an adjacent edge of the upper component for moving the lid between an open orientation for exposing the chambers of the components and a closed orientation sealing the chambers together;

a handle on the upper surface of the lid and a latch interconnecting the components along adjacent edge thereof opposite from the hinge;

an intermediate support component having vertically extending rectangular side walls, a rear wall and a lower wall coupled with respect to each other at their edges, a pair of parallel link rods secured at their lower ends to the interior of the lower component and at their upper ends to the side walls of the intermediate component for movement of the intermediate component between a raised orientation out of the lower component and a lowered orientation within the lower component;

a plurality of leaves arranged in pairs pivotally secured at their lower ends to the interior of the sides of the intermediate support component with rods extending across the length of the intermediate component for the support of lures thereon, the pivotal coupling of the lower ends to the intermediate support being through open apertures with spring-urged pins to allow the pins to be depressed for removing the individual leaves from the intermediate component, each leaf having a fabric covering for providing rigidity to lures positioned on the rods.

3. The device as set forth in claim 2 and further including:

a drawer formed of a plurality of compartments reciprocally mounted within the intermediate component and movable from a recessed storage orientation at which the box is closed and an extended operative position for viewing and handling the contents of the drawer in which orientation the box must be opened.

4. The device as set froth in claim 3 and further including:

a stop-bar located at the forward end of the side supports across the width thereof with an angled interior surface adapted to limit the forward rotation of the forwardmost leaf.

5. The device as set forth in claim 2 and further including:

a transparent window positioned over each of the compartments of the drawer, each of the transparent windows having three free ends and a rearmost end with a hinge secured between the innermost edge of the drawer and the adjacent edge of the window.

\* \* \* \* \*